United States Patent [19]

Gresse et al.

[11] Patent Number: 4,498,735
[45] Date of Patent: Feb. 12, 1985

[54] STEREOSCOPIC VIEWER

[75] Inventors: Herve R. Gresse, Boulogne; Annick R. Carn, Versailles, both of France

[73] Assignee: Compagnie de Materiel de Micrographie "C.M.M.", Saint Maur, France

[21] Appl. No.: 394,841

[22] Filed: Jul. 2, 1982

[30] Foreign Application Priority Data

Jul. 8, 1981 [FR] France ................................ 8113384

[51] Int. Cl.³ ............................................. G02B 27/22
[52] U.S. Cl. .................................................... 350/138
[58] Field of Search ...................... 350/517, 135-139, 350/143, 145

[56] References Cited

U.S. PATENT DOCUMENTS

| | | | |
|---|---|---|---|
| 2,391,675 | 12/1945 | Brown | 350/136 |
| 2,847,906 | 8/1958 | Santoni | 350/136 |
| 2,866,382 | 12/1958 | Gruner et al. | 350/517 |
| 3,418,034 | 12/1968 | Ambrose | 350/517 |
| 3,879,107 | 4/1975 | Chaban | 350/517 |
| 4,221,462 | 9/1980 | Huvers | 350/136 |
| 4,281,923 | 4/1981 | Friedman | 350/517 |

FOREIGN PATENT DOCUMENTS

| | | | |
|---|---|---|---|
| 717129 | 2/1942 | Fed. Rep. of Germany | 350/145 |
| 600305 | 6/1978 | Switzerland . | |
| 135651 | 1/1961 | U.S.S.R. | 350/517 |
| 48011 | 11/1980 | U.S.S.R. | 350/517 |

Primary Examiner—Jon W. Henry
Attorney, Agent, or Firm—Cushman, Darby & Cushman

[57] ABSTRACT

The present invention relates to a stereoscopic viewer which comprises optical elements permitting simultaneous examination, through two eyepieces, of two successive panoramic images in a film of panoramic exposures, the elements defining an optical path between each of the two images and its relevant eyepiece, and control elements for displacing one of the two images received by the observer in relation to the other; the optical elements comprise, for each optical path, on the one hand, a set of mirrors providing an odd number of reflections and, on the other hand, a total-reflection prism, preferably a right prism, the two prisms having, as a base, an isosceles triangle; the faces of the two prisms corresponding to the third side of the base, upon which total reflection is effected, are arranged substantially perpendicularly to the plane of the film to be examined and form between them an angle of about 90°, one of the faces running substantially parallel with the longitudinal axis of the film to be examined.

4 Claims, 3 Drawing Figures

STEREOSCOPIC VIEWER

The present invention relates to a stereoscopic viewer intended for simultaneous examination of two successive images in a film of panoramic exposures produced, more particularly, by an aerial camera.

A viewer of this type is designed to be located above a flat, translucent support upon which the film of panoramic exposures is laid flat, suitable lighting being arranged below the flat translucent support. The viewer comprises, between two objectives facing the film to be observed, and two eyepieces, optical means permitting simultaneous examination of the two successive panoramic images on the film, together with control means permitting displacement of one of the two images received by the observer in relation to the other.

The stereoscopic viewer described in U.S. Pat. No. 4,221,462 contains the above-mentioned characteristics, making it possible to observe a film taken with a camera aboard an aircraft. The camera is directed downwardly and, while exposures are being made, it may pivot about an axis running parallel with the direction of travel of the aircraft. Thus, when an exposure is being made, the camera is displaced, in relation to the pilot of the aircraft, from left to right or from right to left, in such a manner that, on each of the panoramic images of the film, there appears, at the ends of a given image, in the longitudinal direction of the film, the right-hand horizon and the left-hand horizon of the area over which the aircraft is travelling. It follows that, in the case of a film of panoramic exposures, the printed images all start, in one longitudinal direction of the film, with the right-hand horizon and therefore, in the other longitudinal direction, with the left-hand horizon. In order to view a film of this kind with a conventional stereoscope, the film must be cut in such a manner as to place two successive images side by side transversely, so that the right-hand horizon of the one is adjacent the right-hand horizon of the other, and that the left-hand horizon of the one is adjacent the left-hand horizon of the other, the viewing axis then being the common transverse axis of the two images.

The viewer according to U.S. Pat. No. 4,221,462 makes it possible to dispense with such cutting. It also comprises means permitting transverse displacement of one of the two images received by the observer in relation to the other, in order to allow them to merge. The purpose of these control means is to correct the well-known distortion arising from the fact that, between two successive photographs, the image of a point located vertically below the aircraft shifts transversely in the plane of the film substantially faster than the images of points located on the left or right-hand horizons. This relative displacement of points in images, due to the movement of the photographing aircraft, is a function of the speed and altitude thereof. In the above-mentioned patent, control of the relative displacement of the two images, depending upon the part of the image examined, is obtained by complex mechanical means providing appropriate, progressive displacement of the two objectives of the viewer, the space between the objective passing through a maximum at the moment when they are arranged perpendicularly to the centre of two successive panoramic images under observation. The design of this complex device makes it not very manageable.

It is an object of the present invention to overcome the aforesaid disadvantage. It proposes, to this end, a stereoscopic viewer of the type mentioned hereinbefore which will provide particularly simple control of the relative positions of the two images received by the observer, using a very small number of uncomplicated mechanical elements.

Another object of the present invention is to provide a stereoscopic viewer which is practical, reliable and compact.

The present invention therefore relates to a stereoscopic viewer comprising optical means permitting simultaneous examination, through two eyepieces, of two successive panoramic images in a film of panoramic exposures, the means defining an optical path between each of the two images and its relevant eyepiece and control means for displacing one of the two images received by the observer in relation to the other; the optical means comprise, for each optical path, on the one hand, a set of mirrors providing an odd number of reflections and, on the other hand, a total-reflection prism, preferably a right prism, and two prisms having, as a base, an isosceles triangle; the faces of the two prisms corresponding to the third side of the base, upon which total reflection is effected, are arranged substantially perpendicularly to the plane of the film to be examined and form between them an angle of about 90°, one of the faces running substantially parallel with the longitudinal axis of the film to be examined.

According to one embodiment of the invention, the axes of the two eyepieces are arranged in a plane substantially parallel with the longitudinal axis of the film to be examined.

The two prisms preferably have identical bases in the form of right-angled isosceles triangles; if the incident light-ray is parallel with the hypotenuse, the emergent light-ray is an extension of the incident ray.

In a preferred embodiment of the viewer according to the invention, the means for controlling one of the two images received by the observer, in relation to the other, comprise elements allowing at least one of the two prisms to pivot about an axis parallel with the edge thereof opposite the total reflection face. In the case of a right prism, the base of which is a right-angled isosceles triangle, it is desirable for the pivot axis to coincide with the edge of the right dihedral of the prism.

According to another characteristic of the viewer according to the invention, located between each correcting prism and one of the observer's eyes is a convergent lens which returns the image received to infinity, the focus of the lens being upon the film to be examined. Provision may also be made to arrange, between each convergent lens and one of the observer's eyes, an afocal magnification-multiplying unit, the coefficient of the afocal unit used being between 2 and 8, for example. More generally, a group of lenses for increasing magnification may be provided in each optical path.

The distance between the axes of the two eye-pieces of the viewer according to the invention corresponds to the distance between the eyes, i.e. approximately 65 mm. Under these conditions, therefore, the two parallel incident beams impinging upon the two prisms are about 65 mm apart. Now, the viewer according to the invention is used to examine films having substantially higher image periodicities, for example 250 mm; the two inlets to the optical paths of the viewer face two successive panoramic images on the films and are therefore spaced from each other at a distance substantially equal to the aforesaid image periodicity. It is therefore desirable to arrange, between the two prisms and the film to be examined, a set of mirrors receiving two parallel incident beams emanating from two corresponding points in two successive images in the film illuminated through the flat translucent support, permitting them to be returned in parallel and less far apart on the two prisms. A set of mirrors of this kind comprises, preferably for each of the two incident beams it receives and successively from the film to be examined:

a first mirror arranged at about 45° to the plane of the film to be examined and perpendicular to the longitudinal plane of symmetry of the film, the reflecting surface of the mirror facing towards the film;

a second mirror receiving the beam reflected by the first mirror, the plane of the second mirror being perpendicular to the plane of the film to be examined and at an angle of about 45° to the axis of the film;

and a third mirror reflecting the beam emanating from the second mirror and transmitting it to the inlet face of one of the two prisms.

The control elements used in the invention are obviously much simpler than those used in U.S. Pat. No. 4,221,462 to achieve transverse mechanical displacement of the two objectives of the viewer as a function of their location on the two successive panoramic images examined simultaneously. All that is required, according to the invention, is to arrange for one of the two prisms to rotate about an axis and to provide the observer with means for rotating the axis and, possibly, for locking the prism in the angular position selected. For example, the pivot axis may project from the housing of the stereoscopic viewer and may terminate in an operating button for the observer.

When the prism, the total-reflection face of which is substantially perpendicular to the longitudinal axis of the film, is thus rotated, this produces transverse displacement of the zone examined on the corresponding image in the film and this makes it possible to compensate for the displacement of corresponding points in two successive panoramic images. On the other hand, when the other prisms is rotated about its edge, this produces a displacement along the axis of the film of the zone examined on the corresponding image in the film, and this may be useful if the length of the images in the film is slightly modified.

Provision may also be made for at least one of the two first mirrors to be mounted in a slide, so that it can be displaced, in relation to the other mirror, in the direction of the longitudinal axis of the film to be examined. By virtue of this arrangement, the viewer according to the invention may easily be adapted to the image-periodicity of different films, by displacing to a greater or lesser degree the one mirror which is adapted to slide in relation to the other.

According to another embodiment, the second mirrors are adapted to pivot about an axis parallel with the intersecting edge of their planes. This permits transverse displacement of corresponding zones examined in two successive images. Thus transverse control of the unit may be achieved by transverse displacement of the viewer as a whole in relation to the film. This transverse positioning of the viewer may be facilitated by a support-system or rail-system extending transversely of the film and upon which the viewer is mounted.

The third mirrors are preferably stationary and combined into a single unit, the plane of which forms an angle of about 135° in relation to the plane of the film to be examined.

Other advantages and characteristics may be gathered from the following description, which is given merely by way of example and is in no way restrictive, in conjunction with the drawing attached hereto, wherein.

Figure 2:
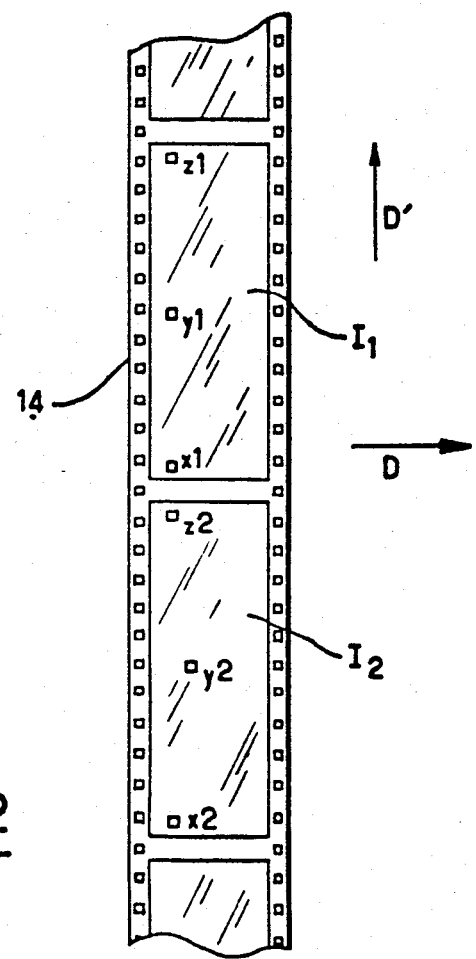
FIG. 2 is a plan view, to an enlarged scale, of a part of the film in FIG. 1.
Figure 3:
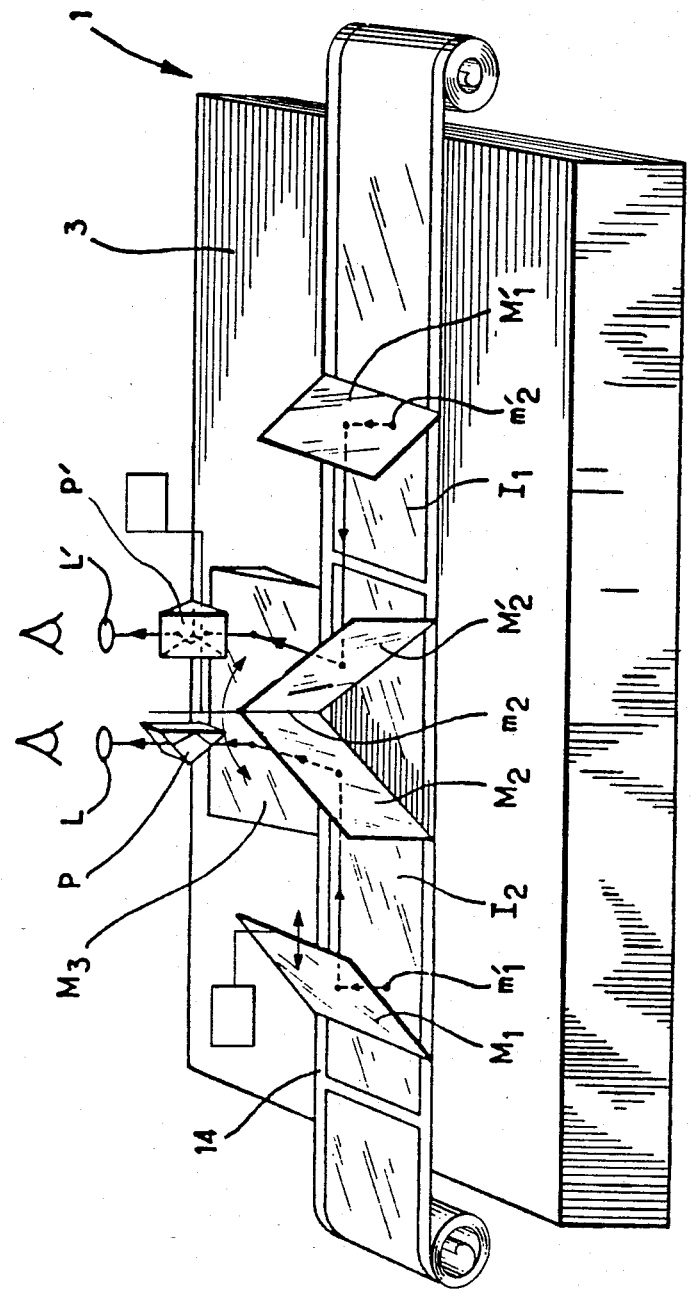
FIG. 3 is a diagram of the stereoscopic viewer according to the invention, showing the constituent optical elements thereof and their relative locations.

FIG. 2 shows two successive photographic images I1 and I2 on a film taken by a panoramic exposure camera mounted in an aircraft. During the exposure, the aircraft travels in the direction D, while the film in the camera unwinds in the direction D'. The camera is directed downwardly and, during the exposure, it pivots in a vertical plane about an axis parallel with the direction D of travel of the aircraft. Thus, in relation to the aircraft pilot, or to an observer located in the direction of travel D, the camera will be displaced, during one exposure, in a sweeping motion going from the right-hand horizon to the left-hand horizon. In other words, for each image I1, I2 recorded, the central part corresponds to the picture taken by the camera while it was pointing vertically downwards, whereas each of the edges perpendicular to the axis of the film corresponds to the beginning or the end of the sweeping motion executed by the camera while it was pointing towards the right or left-hand horizon. If, on panoramic image I1, x1 is a point-image of the right-hand horizon (in relation to the aircraft pilot), z1, located near the opposite edge, is a point-image of the left-hand horizon and y1, located on the median transverse axis of panoramic image I1, is the nadiral image-point. At one point, object Z on the left-hand horizon corresponds to image-point z1 on panoramic image I1 and image-point z2, on following panoramic image I2, corresponds to this same point. Similarly, image-points x2, y2 and I2 correspond to image-points x1, y1 and I1: x1 and x2, y1 and y2, z1 and z2 are said to be corresponding points on two successive images, corresponding respectively to object-points X,Y,Z of the space photographed.

It is known that with flight in the direction of arrow D, the image of an object-point located on the horizon is scarcely displaced transversely in the plane of the film in passing from one image to the next, whereas the image of an object-point located vertically below the aircraft, i.e. at the nadir, moves transversely in the plane of the film over a by no means negligeable distance; this produces transverse distortion as a function of the altitude and speed of the aircraft. As shown in FIG. 2, therefore, the transverse distance separating corresponding image-points y1 and y2 is definitely greater than the transverse distance separating two corresponding image-points x1–x2 or z1–z2 located respectively on the right- or left-hand horizon, the latter distance being practically negligeable.

Figure 1:
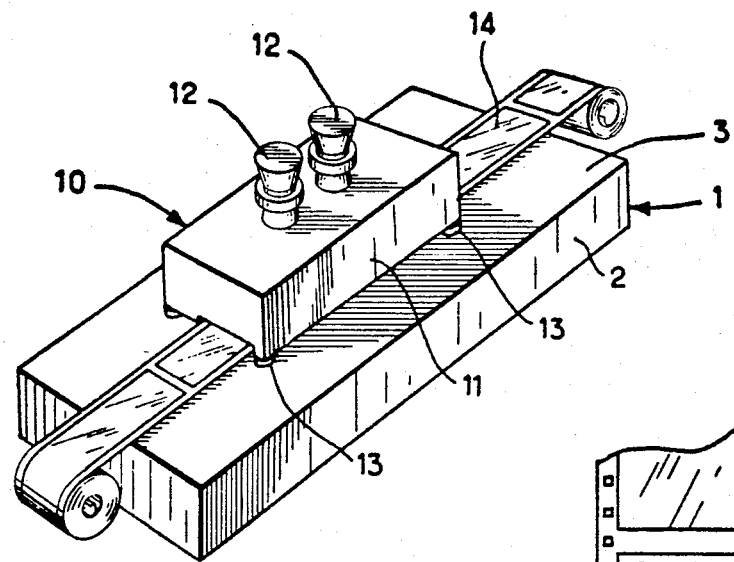
FIG. 1 is a diagrammatical perspective of a unit comprising a luminous table, a film from a panoramic camera arranged to unwind across the table and a stereoscopic viewer according to the invention which makes it possible to observe the film.

In FIG. 1, a luminous table 1, of known type, comprises a lateral wall 2 surmounted by a horizontal sheet 3 of translucent glass; lighting (not shown) is arranged under the sheet of glass.

The panoramic exposure film 14, to be examined, is unwound and is applied flatly to sheet 3 of translucent glass by means of conventional elements, not shown. In this example of embodiment, the length of the film images is 250 mm. An "OMERA 30" camera was used to take the pictures.

In this example, a stereoscopic viewer 10 rests directly upon sheet 3 of translucent glass on luminous table 1; the viewer is arranged astride film 14, housing 11 thereof being provided, to this end, with four low rubber feet 13 which support it on the sheet of glass; housing 11 carries two eyepieces 12, the distance between which is the average distance between the eyes (about 65 mm). The parallel axes of eyepieces 12 are arranged in a plane parallel with the longitudinal axis of the film to be examined, whereas in U.S. Pat. No. 4,221,462, the plane of the axis of the two eyepieces is at right angles to the axis of the film. The arrangement of the axes of eyepieces 12, in a plane parallel with the axis of the film is an interesting characteristic, since the observer is thus located, in relation to each panoramic image on the film, in the same way as the aircraft pilot in relation to the area being photographed. In this way, the part of each panoramic image located to the observer's left corresponds to the area to the left of the pilot, which obviously facilitates referencing.

Arranged in the lower surface of housing 11, which is adjacent and parallel with sheet 3 of translucent glass, are two apertures constituting the inlets to the two optical paths of viewer 10 relating to the two successive panoramic images I1 and I2 to be examined. Located opposite each of the apertures is a mirror M1, M'1 respectively, the mirrors being arranged symmetrically with a vertical plane at right angles to the plane of the film to be examined, their reflecting surfaces facing towards each other; each mirror is arranged at 45° in relation to the plane of the film, and the intersecting edge of their planes is at right angles to the longitudinal axis of the film.

The projections of the centres of mirrors M1 and M'1 onto the plane of the film are marked m'1 and m'2; the distance between m'1 and m'2 is substantially equal to the length of the panoramic image on film 14 and is therefore definitely greater than the distance between the eyepieces 12.

Mirrors M1 and M'1 are preferably mounted upon longitudinal slides (not shown) within housing 11, so that the distance between them can be adjusted as a function of the length of the panoramic images on different films.

Located between mirrors M1 and M'1 are two other mirrors M2 and M'2 which are symmetrical with the vertical plane of symmetry of mirrors M1 and M'1; each mirror M2, M'2 is arranged in a vertical plane at an angle of 45° to the longitudinal axis of film 14. Mirrors M2, M'2 form a right dihedral having a vertical edge m2; mirrors M2, M'2 are preferably mounted to pivot about an axis passing through their common vertical edge m2; this permits slight variations of the 45° angle which they make with the axis of the film to be examined, while still preserving the same plane of symmetry.

The light rays reflected by mirrors M1 and M'1 are reflected by associated mirrors M2 and M'2 and pass to a common stationary mirror M3, the plane of which is at an angle of 135° with the plane of film 14. Mirror M3 receives two parallel light beams reflected by the pair of mirrors M2, M'2 and reflects them vertically upwards towards prisms P, P'.

It should be pointed out that mirrors M1, M'1, M2, M'2 and common mirror M3 constitute an optical system which makes it possible to bring together the two incident light beams arriving from the two image-parts examined, which are about 250 mm from each other, in such a manner that these two beams, upon leaving the system are only about 65 apart, i.e. the average distance between the eyes of an observer.

Prisms P, P' are identical right prisms arranged on each side of the vertical plane of symmetry of mirrors M1, M'1, M2 and M'2. The base of prisms P, P' is a right-angled isosceles triangle. The hypotenuses thereof are arranged vertically and therefore at right angles to the plane of film 14. They form an angle of 90° to each other. The hypotenuse of prism P is at right angles to the longitudinal axis of film 14.

In the case of each prism P, P', the light rays reflected by mirror M3 pass through one of the two faces of the right dihedral, are reflected by the hypotenuse, and emerge through the other face of the right dihedral. The light rays passing through prisms P, P' are not deflected in any way. At the outlets from prisms P, P' there appear two vertical emerging beams, the distance between which is the same as that between the two incident vertical beams; each of these beams is directed to a convergent lens L, L' located within each eyepiece 12. The convergent lenses reflect the image to infinity, the foci thereof being arranged in the plane of film 14, bearing in mind the optical path.

Finally, the optical system of the stereoscopic viewer may be completed by two afocal magnification-multiplying units (not shown) located between convergent lenses L, L' and the eyes of the observer. The magnification of the units used may vary between 2 and 8.

One of the essential characteristics of stereoscopic viewer 10 is the relative transverse adjustment of the two images received by the observer: thus, in order to eliminate, from the zone observed, the transverse displacement of corresponding points in the two images examined, the observer varies the angle of the hypotenuse of prism P by causing it to pivot about its opposite horizontal edge. This variation of the angle of prism P may be carried out by very simple mechanical means, for instance an axis arranged along the edge of the prism and integral therewith, the axis extending, for example, outside housing 11 in the form of an operating button. This displaces, on the film, the image-zone observed through prism P, whereas that observed through prism P' remains stationary. This provides compensation for transverse displacement of corresponding points.

It is to be understood that transverse adjustment of the stereoscopic-viewer unit in relation to the film, i.e. simultaneous adjustment of the two images received by the observer, may be obtained by displacing viewer 10 in relation to the film. Transverse adjustment may also be effected by causing associated mirrors M2, M'2 to pivot slightly about an axis parallel with their intersecting edge m2.

On the other hand, rotating prism P' about its edge facing the hypotenuse causes longitudinal displacement of the zone observed through prism P', which may make it possible to compensate for a slight variation in the length of successive images.

It is to be understood that the embodiments described hereinbefore are in no way restrictive, but may be modified as desired, without departing from the scope of the invention.

The embodiments of the invention in which an exclusive property or privilege is claimed are defined as follows:

1. A stereoscopic viewer for aerial photographs, said viewer being intended to be located over a flat translucent support across which a film to be examined is unwound flatly, suitable lighting being arranged below said flat translucent support, said viewer comprising: optical means to examine simultaneously, through two eyepieces, two successive panoramic images in a film of panoramic exposures, said optical means defining an optical path between each of the two images and its relevant eyepiece; said optical means including, for each optical path, on the one hand, a set of mirrors providing an odd number of reflections and, on the other hand, a total-reflection prism; each said prism each being in the form of an isosceles triangle and each having a base and two faces, said base being the side where total reflection is effected, each said base extending substantially perpendicularly to the plane of the film to be examined, and said bases of said prisms extending at an angle of about 90° to one another; one of said bases lying in a plane extending perpendicular to the plane of the film to be examined, the set of mirrors being arranged between the two prisms and the film to be examined and comprising, for each of the two optical paths, successively, from the film to be examined;

a first mirror arranged at an angle of about 45° to the plane of the film to be examined and at right angles to the longitudinal plane of symmetry of the film, the reflecting surface of said mirror facing said film;

a second mirror receiving the beam reflected by the first mirror, the plane of said second mirror being at right angles to the plane of the film to be examined and forming an angle of about 45° with the longitudinal axis of said film;

and a third mirror reflecting the beam arriving from said second mirror and passing it to the inlet face of one of the two prisms.

2. A viewer according to claim 1, wherein said third mirrors for the two beams of the two optical paths are combined into one and the same element.

3. A viewer according to claim 1, wherein at least one of the two first mirrors is mounted within a slide in such a manner that it can be displaced in relation to the other first mirror along the longitudinal axis of the film to be examined.

4. A viewer according to one of claims 1 or 3, wherein the two second mirrors of the two optical paths are mounted to pivot about an axis parallel with, or coinciding with, their intersection edge.

* * * * *